(12) United States Patent
Gay

(10) Patent No.: US 6,691,010 B1
(45) Date of Patent: Feb. 10, 2004

(54) METHOD FOR DEVELOPING AN ALGORITHM TO EFFICIENTLY CONTROL AN AUTONOMOUS EXCAVATING LINKAGE

(75) Inventor: John R. Gay, Chapel Hill, NC (US)

(73) Assignee: Caterpillar Inc, Peoria, IL (US)

( * ) Notice: Subject to any disclaimer, the term of this patent is extended or adjusted under 35 U.S.C. 154(b) by 158 days.

(21) Appl. No.: 09/713,591

(22) Filed: Nov. 15, 2000

(51) Int. Cl.$^7$ .............. G06F 19/00; G06G 7/00; G01C 22/00; B62D 11/00
(52) U.S. Cl. .............. 701/50; 701/27; 701/44; 37/414; 172/2
(58) Field of Search .............. 701/50, 27, 44; 37/414; 414/699; 172/2; 700/245, 246, 250, 251, 252, 253, 257, 261, 262

(56) References Cited

U.S. PATENT DOCUMENTS

| | | | |
|---|---|---|---|
| 4,990,838 A | * 2/1991 | Kawato et al. | 700/246 |
| 5,047,701 A | * 9/1991 | Takarada et al. | 700/246 |
| 5,065,326 A | * 11/1991 | Sahm | 340/686.1 |
| 5,461,803 A | * 10/1995 | Rocke | 37/443 |
| 5,504,841 A | * 4/1996 | Tani | 700/246 |
| 5,682,312 A | * 10/1997 | Rocke | 37/414 |
| 5,699,247 A | * 12/1997 | Moriya et al. | 172/4.5 |
| 5,908,458 A | * 6/1999 | Rowe et al. | 701/50 |
| 6,052,636 A | * 4/2000 | Lombardi | 701/50 |
| 6,058,344 A | * 5/2000 | Rowe et al. | 414/744.3 |
| 6,064,933 A | * 5/2000 | Rocke | 701/50 |
| 6,076,030 A | * 6/2000 | Rowe | 172/4.5 |
| 6,108,949 A | * 8/2000 | Singh et al. | 37/414 |
| 6,167,336 A | * 12/2000 | Singh et al. | 172/2 |
| 6,181,983 B1 | * 1/2001 | Schlemmer et al. | 700/245 |
| 6,317,669 B1 | * 11/2001 | Kurenuma et al. | 701/50 |
| 6,353,829 B1 | * 3/2002 | Koblenz et al. | 707/100 |
| 6,356,829 B1 | * 3/2002 | Fan et al. | 701/50 |
| 6,363,632 B1 | * 4/2002 | Stentz et al. | 37/414 |
| 6,371,214 B1 | * 4/2002 | Anwar et al. | 172/1 |

OTHER PUBLICATIONS

"A First Course in Fuzzy Logic Second Edition", by Hung T. Nguyen et al., Published 2000, pp., 177–179, 191–192.

* cited by examiner

*Primary Examiner*—William A. Cuchlinski, Jr.
*Assistant Examiner*—Brian J. Broadhead
(74) *Attorney, Agent, or Firm*—Hancock & Estabrook, Ltd.; Diana Charlton; Todd Benni

(57) ABSTRACT

The present invention is a control system for controlling movement of a work implement from a dig location to a dump location. The work implement has at least four degrees of freedom defined by a swing joint angle $\theta_{swing}$, a boom joint angle $\theta_{boom}$, a stick joint angle $\theta_{stick}$, and a bucket joint angle $\theta_{bucket}$. In one embodiment, the control system comprises a central processing unit and a memory device. The control system further comprises an initialization module stored on the memory device and adapted to determine specified initial and final joint angles for an initial cycle of the work implement indicative of the specified dig and dump locations, respectively. The control system further comprises a hydraulic valve connected to the central processing unit and to the work implement. The control system further comprises a fuzzy control module stored on the memory device. The fuzzy control module comprises a fuzzy-logic swing valve control module, a fuzzy-logic boom valve control module and a fuzzy-logic stick valve control module each adapted to instruct the central processing unit in a finite state manner to output at least one control signal to the hydraulic valve to cause the work implement to smoothly move from the dig location to the dump location while minimizing energy requirements.

14 Claims, 8 Drawing Sheets

METHOD FOR DEVELOPING AN ALGORITHM TO EFFICIENTLY CONTROL AN AUTONOMOUS EXCAVATING LINKAGE

TECHNICAL FIELD

This invention relates generally to excavating machines and, more particularly, the present invention relates to automated excavating machines and processes.

BACKGROUND ART

U.S. Pat. No. 5,065,326 discloses the process of autonomously controlling the linkage of an excavating machine during a full work cycle. Different methods on how to control the linkage of an excavating machine have also been disclosed in the literature. One approach is to generate the trajectory for the endpoint of the linkage and then regulate the linkage about this trajectory. The method of generating a three dimensional trajectory and computing the necessary control to follow a three dimensional spline is computationally intensive. This type of control algorithm also needs a reference on how to generate the three dimensional trajectory. Additionally this method does not try to minimize the amount of time or power required to execute a work cycle.

U.S. Pat. No. 5,065,326 also discloses an approach in the form of a finite state machine where each joint rotates until the next joint begins its motion. In this algorithm the state transitions are programmed a priori.

U.S. Pat. No. 5,908,458 discloses a variation of the above referenced finite state machine algorithm which creates parameterized scripts that vary the state transition points for each joint as work progresses. This control method generates a learning base to evaluate previous cycle executions and to predict future cycles. From the generated scores a trajectory is determined and appropriate parameters are set for the system. The score is generated by a knowledge base that is built as the machine operates. This method relies on parallel processing to execute multiple algorithms to generate future parameters for the system.

Other methods of generating a trajectory for the linkage to follow are teach and playback methods. This approach assumes the operators input was efficient and does not update the motion of the linkage as the system changes or the geometry of the dig and dump locations change.

The present invention is directed to overcoming one or more of the problems or disadvantages associated with the prior art.

DISCLOSURE OF THE INVENTION

The present invention is a system and method for controlling movement of a work implement from a specified dig location to a specified dump location. The work implement has at least four degrees of freedom defined by a swing joint angle $\theta_{swing}$, a boom joint angle $\theta_{boom}$, a stick joint angle $\theta_{stick}$, and a bucket joint angle $\theta_{bucket}$. In one embodiment, the control system comprises a central processing unit and a memory device. The control system further comprises an initialization module stored on the memory device and adapted to determine specified initial and final joint angles for an initial cycle of the work implement indicative of the specified dig and dump locations, respectively. The control system further comprises a hydraulic valve connected to the central processing unit and to the work implement. The control system further comprises a controller module stored on the storage device. The controller module comprises a fuzzy-logic swing valve control module, a fuzzy-logic boom valve control module and a fuzzy-logic stick valve control module each adapted to instruct the central processing unit in a finite state manner to output at least one control signal to the hydraulic valve to cause the work implement to smoothly move from the dig location to the dump location while minimizing energy requirements and computing power.

BRIEF DESCRIPTION OF THE DRAWINGS

The following description of the invention will better understood with reference to the accompanying drawings in which.

BEST MODE FOR CARRYING OUT THE INVENTION

Figure 1:
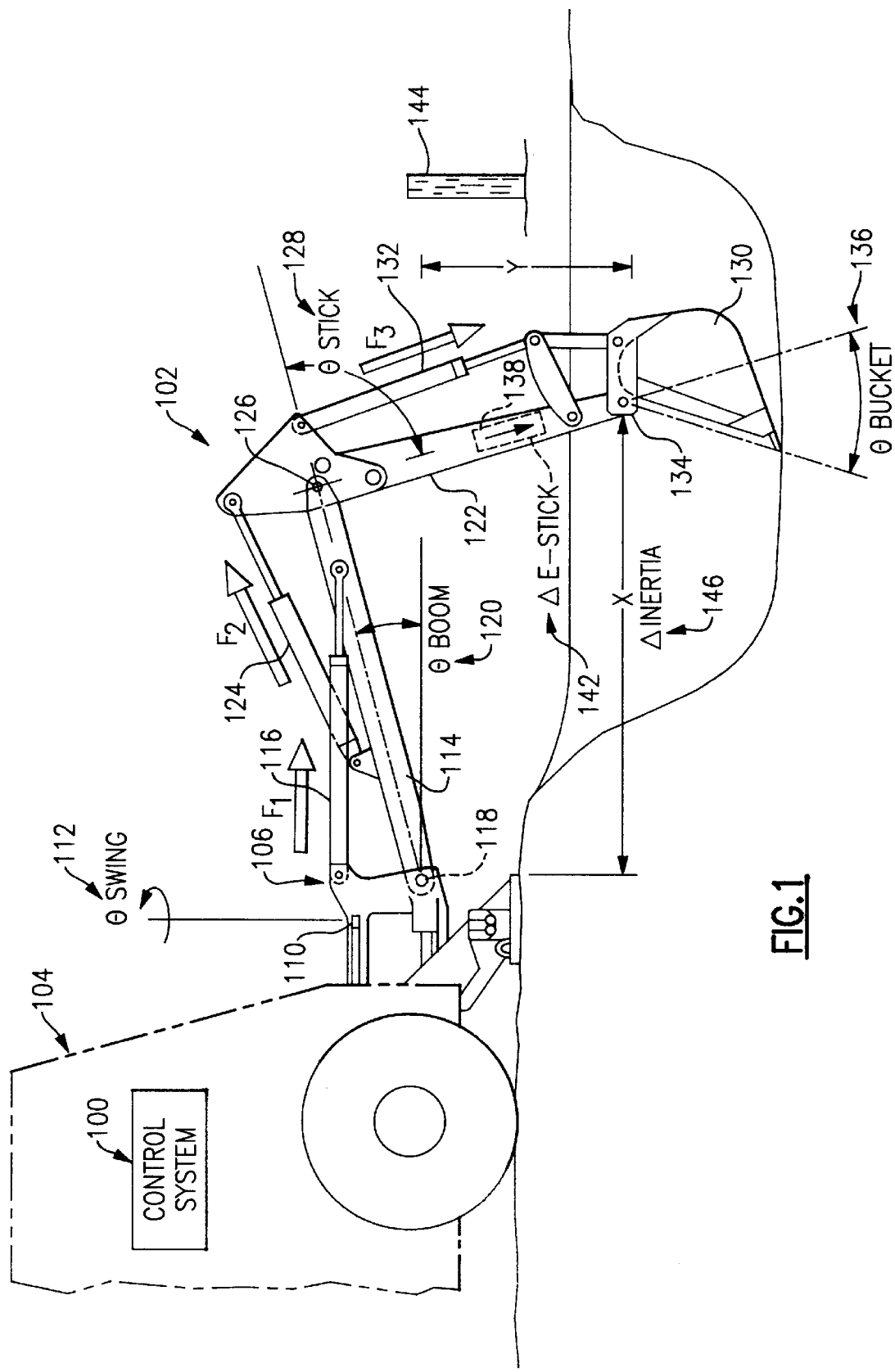
FIG. 1 is a perspective view showing an excavating machine having a work implement and the control system of the present invention.

Referring to FIG. 1, wherein the present invention is a control system 100 for controlling movement of a work implement 102 of an excavating machine 104 from a dig location to a dump location. The work implement 102 comprises a swing casting 106 controllably moveable by actuation of a swing hydraulic cylinder 108 about a swing pivot pin 110 through a swing joint angle $\theta_{swing}$ 112. The work implement 102 further comprises a boom 114 controllably moveable by actuation of a boom hydraulic cylinder 116 about a boom pivot pin 118 through a boom joint angle $\theta_{boom}$ 120. The work implement 102 further comprises a stick 122 controllably moveable by actuation of a stick hydraulic cylinder 124 about a stick pivot pin 126 through a stick joint angle $\theta_{stick}$ 128. The work implement 102 further comprises a bucket 130 controllably moveable by actuation of a bucket hydraulic cylinder 132 about a bucket pin 134 through a bucket joint angle $\theta_{bucket}$ 136. The work implement 102 may further comprise an e-stick 138 telescopically disposed within the stick 122 defined by an e-stick displacement 142 and controllably moved by actuation of an e-stick hydraulic cylinder 140. The work implement 102 has a delta linkage inertia value denoted 146 measured by distance x. A reference stake 144 defines the initial dig location. In the embodiment shown, each of hydraulic cylinders 108, 116, 124, 132, and 140 are linear hydraulic cylinders.

Figure 2:
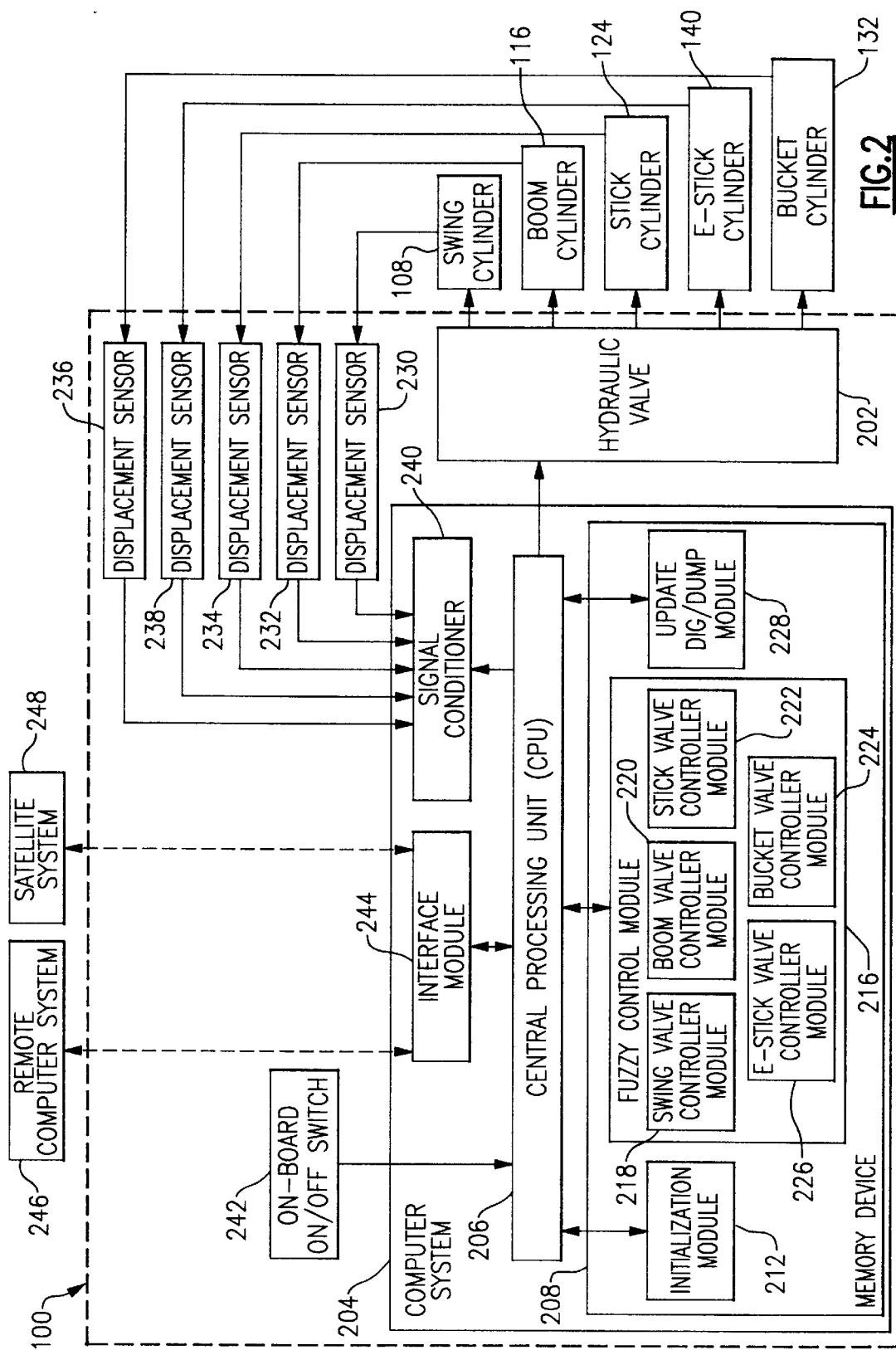
FIG. 2 is a high level block diagram showing the electrical and electro-mechanical architecture of the control system of the present invention and its operating environment.

Referring to FIG. 2, wherein the control system 100 generally comprises a hydraulic valve 202 having a plurality of spools (not shown) one of each is connected to the swing cylinder 108, boom cylinder 116, stick cylinder 124, e-stick cylinder 140, and the bucket cylinder 132, respectively. The control system 100 further comprises a computer system 204 having a central processing unit 206 and a memory device 208. In the embodiment shown, the memory device 208 is an erasable programmable memory (EPROM).

The control system 100 further comprises a primary control module 211 stored on the memory device 208. The primary control module 211 generally comprises an initialization module 212, a fuzzy control module 216, and an update dig/dump control module 228. The initialization module 212 is generally adapted to determine initial and final joint angles for an initial cycle of the work implement 102 indicative of the dig and dump locations, respectively. As will described more fully herein, the fuzzy control module 216 is generally adapted to provide a fuzzified and de-fuzzified hydraulic valve control signal to each of the hydraulic cylinders, in a finite state manner, in response to the initial and final swing joint angle 112, the initial and final boom joint angle 120, the initial and final stick joint angle 136, the initial and final bucket joint angle 136, and the initial and final e-stick displacement 142, and the delta linkage inertia 146, to thereby smoothly move the work implement 102 from the dig location to the dump location (and to dump bucket 130) while minimizing energy requirements and computing power. The update dig/dump location module 228 is generally adapted to update the current value of the dig and dump locations after each movement of the work cycle to ensure that the work implement 102 can operationally dig and dump the material to be excavated. The update dig/dump location module 228 may take the form of a variety of well known algorithms.

The fuzzy control module 216 generally comprises a fuzzy-logic swing valve control module 218, a fuzzy-logic boom valve control module 220, a fuzzy-logic stick valve control module 222, a fuzzy-logic e-stick valve control module 226, and a bucket valve control module 224, all adapted to instruct the central processing unit 206 in a finite state manner to output a first de-fuzzified control signal to the hydraulic valve 202 to cause the work implement 102 to smoothly move from the dig location to the dump location while minimizing energy requirements.

The control system 100 further comprises displacement sensors 230, 232, 234, 236, and 238 connected between the swing cylinder 108, boom cylinder 116, stick cylinder 124, e-stick cylinder 140, and the bucket cylinder 132, respectively, and a signal conditioner 240. Displacement sensors 230, 232, 234, 236, and 238 are provided to sense the amount of displacement of the swing cylinder 108, boom cylinder 116, stick cylinder 124, e-stick cylinder 140, and the bucket cylinder 132, respectively, and to output such values to the signal conditioner 240.

The control system 100 further comprises an on/off switch 242 connected to the central processing unit 206 and adapted to enable the initialization module 212. In other embodiments, enablement and initialization of the control system 100 may be accessed from a remote computer system 246 or a satellite system 248.

Figure 3:
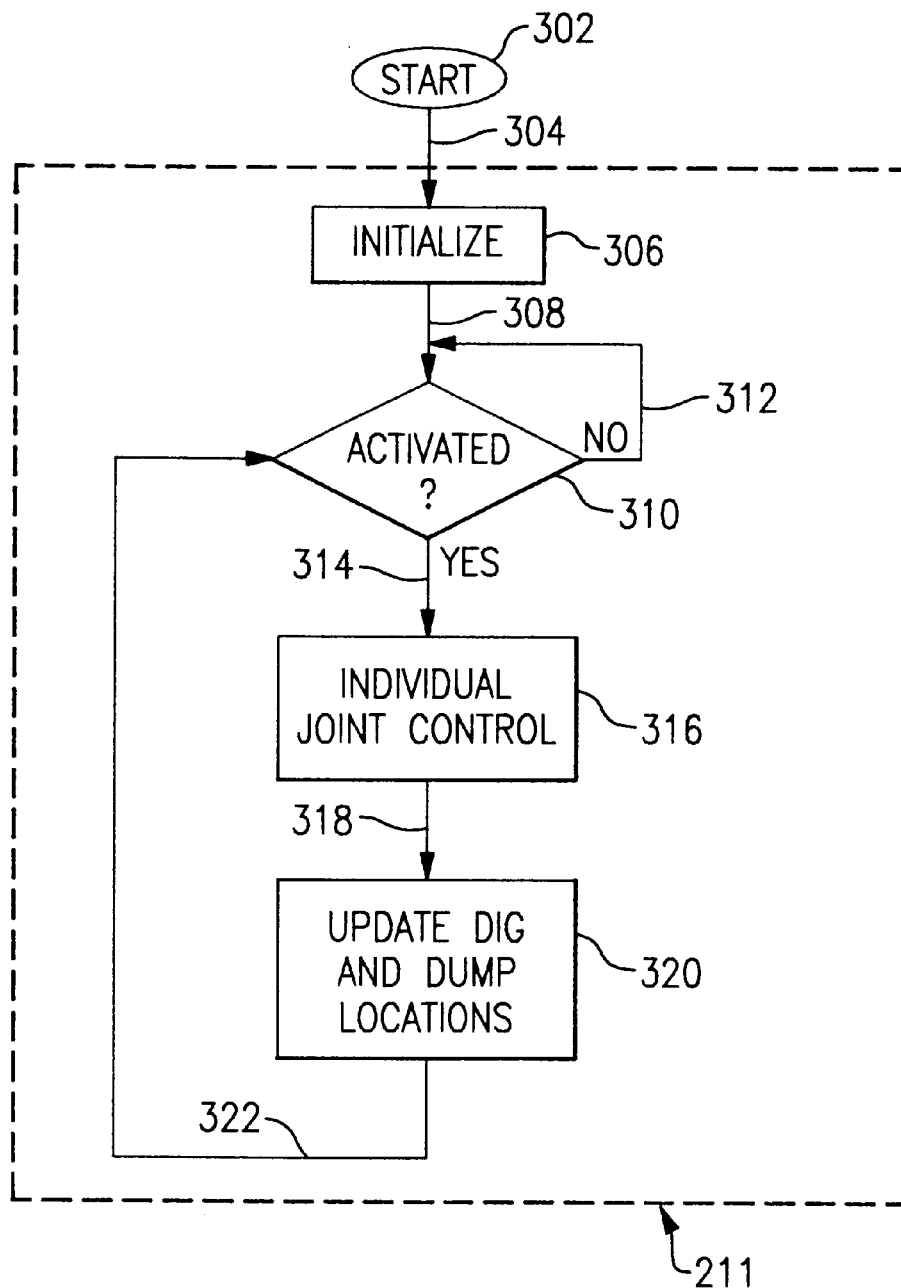
FIG. 3 is a high level flow chart showing the general operation of the controller module of the present invention.

Referring to FIG. 3, the operation of the primary control module 211 is shown. As indicated by a start block 302 the primary control module 211 is enabled. Control is passed along a path 304 to execution block 306. As indicated by execution block 306, the initialization module 212 is enabled. Control is passed along a path 308 to a decisional block 310. As indicated by decisional block 310, the primary control module 211 determines whether or not the fuzzy control module 216 should be enabled. If the fuzzy control module 216 is not being enabled control is returned along a path 312 to decisional block 310 where a waiting mode occurs. If the fuzzy control module 216 is being enabled, control is passed along a path 314 to execution block 316. As indicated by execution block 316, the fuzzy control module or individual joint control module 216 is enabled, and, therefore, control is passed along a path 318 to execution block 320. As indicated by execution block 320, the update dig/dump location module 228 is enabled and the dig and dump locations are updated. Control is returned along a path 322 to decisional block 310 where the waiting mode continues for the next movement of the work cycle.

Figure 4:
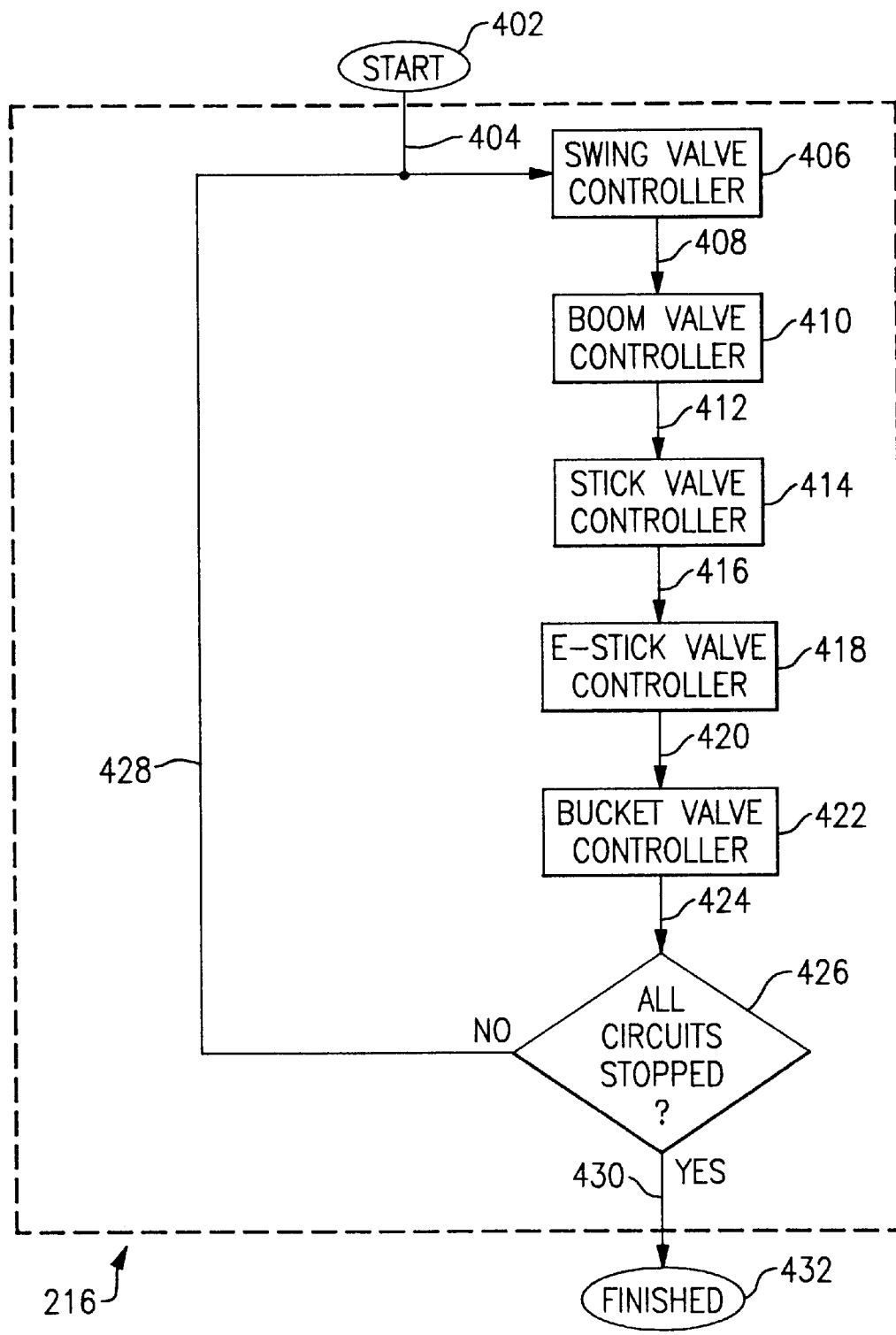
FIG. 4 is a high level flow chart showing the general operation of the swing valve controller module, the boom valve controller module, the stick valve controller module, the e-stick valve controller module, and the bucket valve controller module.

Referring to FIG. 4, the operation of the fuzzy control module 216 is shown. As indicated by a start block 402 the fuzzy control module 216 is enabled. Control is passed along a path 404 to an execution block 406. As indicated by execution block 406, the swing valve control module 218 is enabled. Upon execution of the swing valve control module 218 control is passed along a path 408 to an execution block 410. As indicated by execution block 410, the boom valve control module 220 is enabled. Upon execution of the boom valve control module 220, control is passed along a path 412 to an execution block 414. As indicated by execution block 414, the stick valve control module 222 is enabled. Upon execution of the stick valve control module 222, control is passed along a path 416 to an execution block 418. As indicated by execution block 418, the e-stick valve control module 226 is enabled. Upon execution of the e-stick valve control module 226, control is passed along a path 420 to an execution block 422. As indicated by execution block 422, the bucket valve control module 224 is enabled. Upon execution of the bucket valve control module 224, control is passed along a path 408 to a decisional block 426. As indicated by decisional block 426, the fuzzy control module 216 determines if all of the individual joint control modules (i.e., the swing valve control module 218, the boom valve control module 220, the stick valve control module 222, the e-stick valve control module 224 and the bucket valve control module 226) have been executed and movement fully stopped. If movement has not been stopped, control is returned along a path 428 to execution block 406 where the swing valve control module 218 is executed. If movement has been stopped, control is passed along a path 430 to a finish or end block 432.

Figure 5:
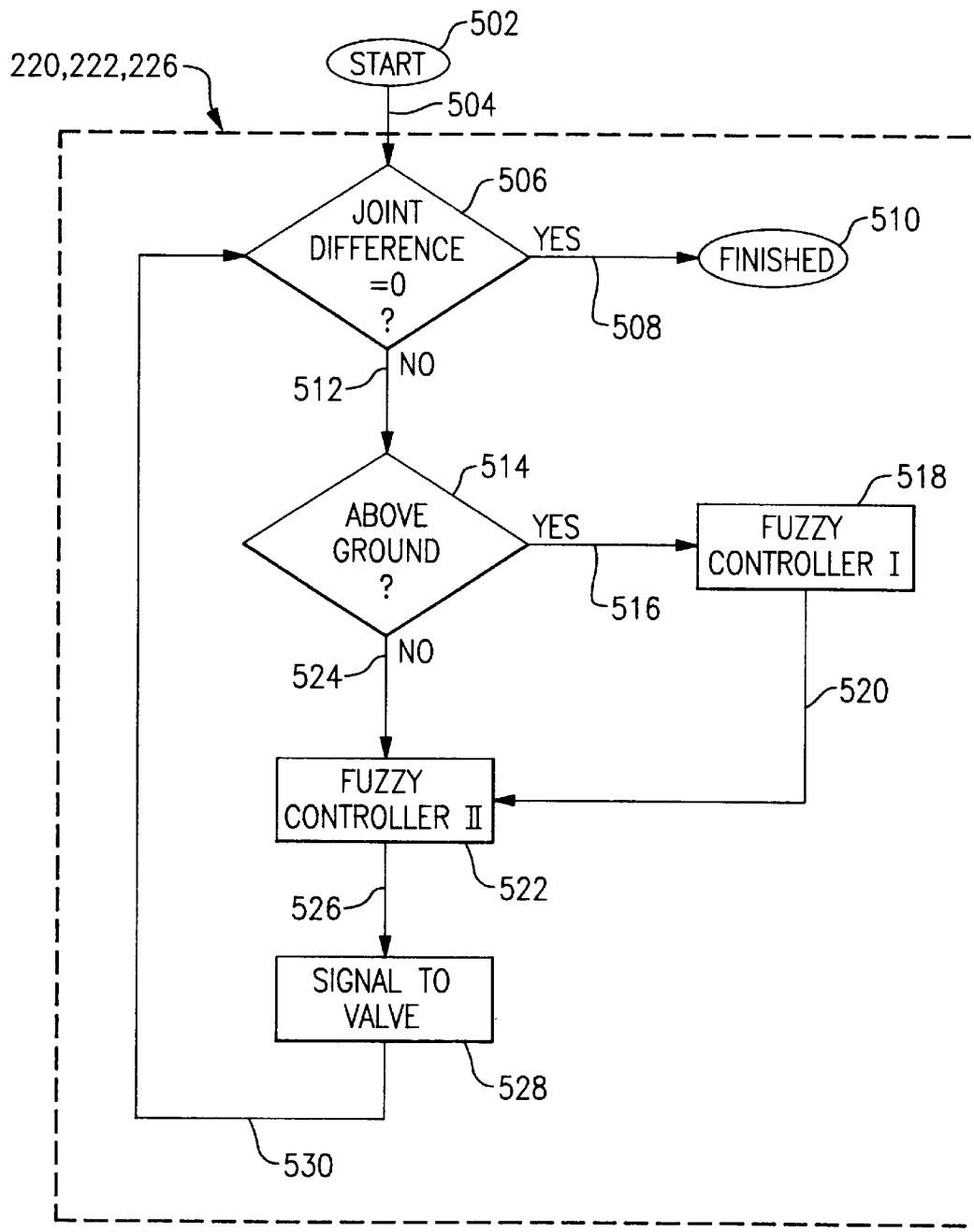
FIG. 5 is a high level flow chart showing the general operation of the boom valve controller module, the stick valve controller module and the e-stick valve controller module and the first and second fuzzy controllers.

Referring to FIG. 5, operation of the boom valve control module 220, stick valve control module 222, and e-stick valve control module 226 are shown. Although only one flow chart is shown, each of the boom valve control module 220, stick valve control module 222, and e-stick valve control module 226 would complete one loop through the flow chart. For purposes of illustration only, the boom valve control module 220 will be described. As indicated by a start block 502, the boom valve control module 220 is enabled. Control is passed along a path 504 to a decisional block 506. As indicated by decisional block 506, the boom valve control module 220 is adapted to determine whether or not there is a difference between the current and final joint angle of the boom (delta joint angle of boom). Upon initialization, the current joint angle of the boom would correspond to the joint angle of the boom at the initial dump location. If the delta joint angle of the boom is zero then control is passed along a path 508 to a finish block 510. If the delta joint angle of the boom is not zero then control is passed along a path 512 to a decisional block 514. As indicated by decisional block 514, the boom valve control module 220 is adapted to determine whether or not the bucket 130 is above or below the ground. If the bucket 130 is above the ground then control is passed along a path 516 to an execution block 518. As indicated by execution block 518 and as will be described more fully herein, a first fuzzy controller is enabled and control is passed along a path 520 is an execution block 522. As indicated by execution block 522 and as will be described more fully herein, a second fuzzy controller is enabled. If the bucket 130 is below the ground then control is passed along a path 524 to execution block 522 where the second fuzzy controller is enabled. Control is then passed along a path 526 to an execution block 528. As indicated by execution block 528, the boom valve control module 220 is adapted to generate a fuzzified boom hydraulic valve control signal. Control is then returned along a path 530 to decisional block 506.

Figure 6:
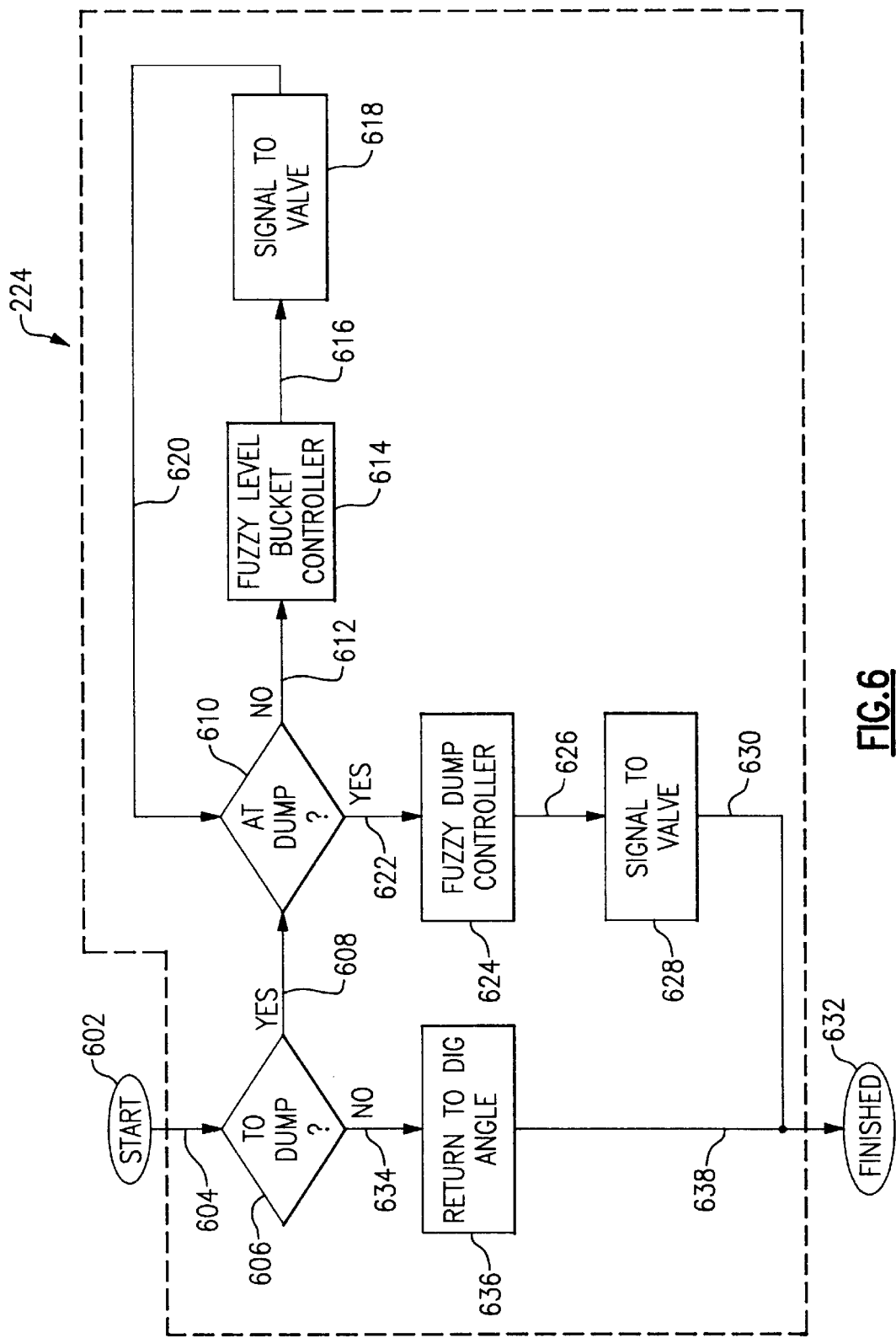
FIG. 6 is a high level flow chart showing the general operation of the bucket valve controller module having a fuzzy dump controller and a fuzzy level bucket controller.

Referring to FIG. 6, the operation of the bucket valve control module 224 is described. As shown by a start block 602, the bucket valve control module 224 is enabled. Control is then passed along a path 604 to a decisional block 606. As indicated by decisional block 606, the bucket valve control module 224 is adapted to determine whether or not the work implement 102 is moving toward the dump location. If the work implement 102 is moving toward the dump location control is passed along a path 608 to a decisional block 610. As indicated by decisional block 610, the bucket valve control module 224 is adapted to determine whether or not the work implement 102 is at the dump location. If the work implement 102 is not at the dump location then control is passed along a path 612 to an execution block 614. As indicated by execution block 614, the bucket valve control module 224 enables a fuzzy level bucket controller which is adapted to generate a fuzzified hydraulic valve control signal to maintain the level of the bucket 130 to avoid spillage of material while the work implement 102 is heading to the dump location. Control is then passed along a path 616 to an execution block 618. As indicated by execution block 618, the fuzzified hydraulic valve control signal is de-fuzzified and output to the hydraulic valve 202. Control is then returned along a path 620 to decisional block 610. Returning to decisional block 610, if the work implement 102 is at the dump location then control is passed along a path 622 to an execution block 624. As indicated by execution block 624, the bucket valve control module 224 enables a fuzzy dump controller which is adapted to generate a fuzzified hydraulic valve control signal to dump the bucket 130. Control is then passed along a path 626 to an execution block 628. As indicated by execution block 628, the fuzzified hydraulic valve control signal is de-fuzzified and output to the hydraulic valve 202. Control is then passed along a path 630 to a finish block 632. Returning to decisional block 606, if the work implement 102 is not moving toward the dump location then control is passed along a path 634 to an execution block 636. As indicated by execution block 636, the bucket valve control module 224 is adapted to return the bucket 130 to the dig posture or bucket joint angle corresponding to the desired dig angle. Control is then passed along a path 638 to the finish block 632.

Figure 7:
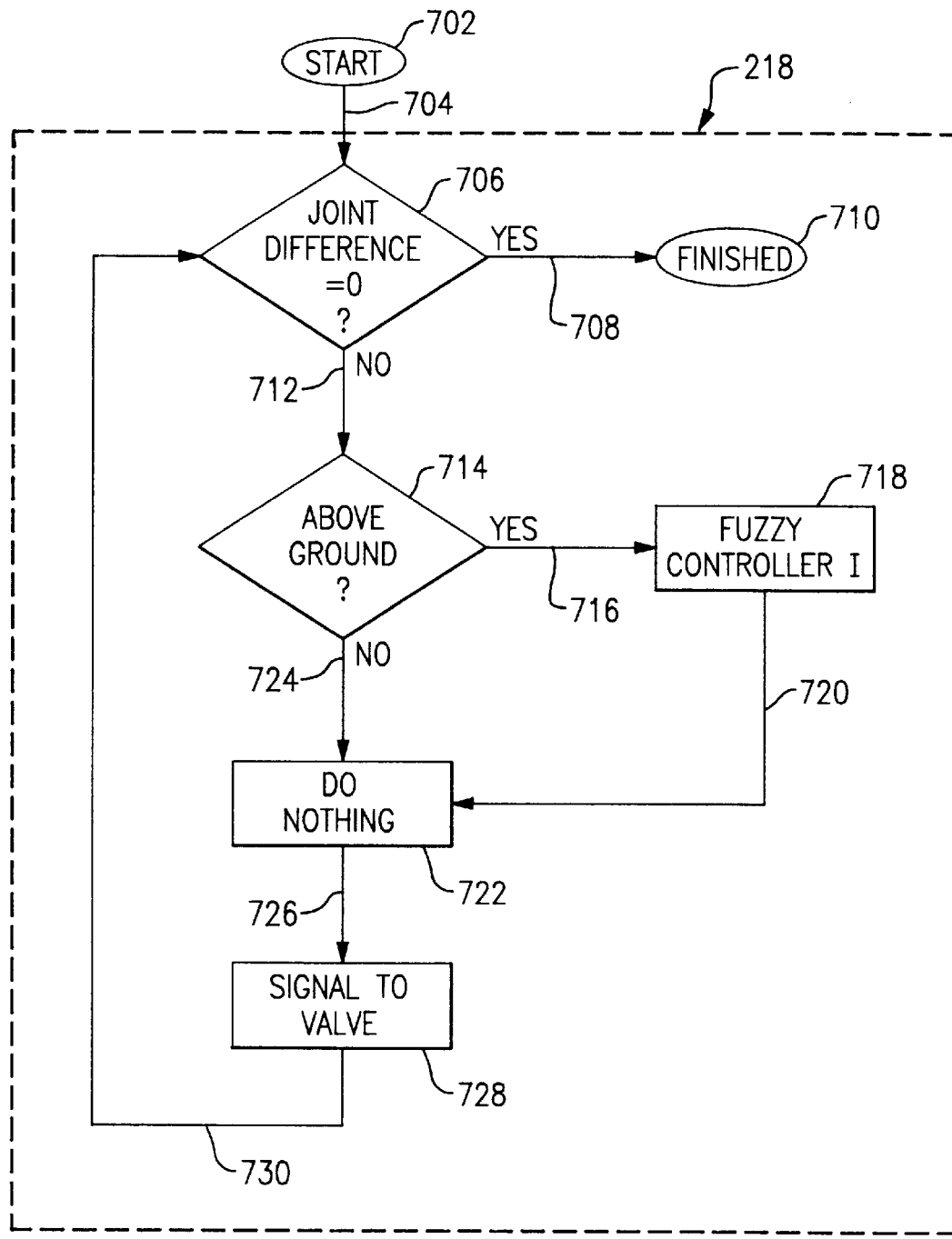
FIG. 7 is a high level flow chart showing the general operation of the swing valve controller module having a first fuzzy controller.

Referring to FIG. 7, the operation of the swing valve control module 218 is described. As indicated by a start block 702, the swing valve control module 218 is enabled. Control is passed along a path 704 to a decisional block 706. As indicated by decisional block 706, the swing valve control module 218 is adapted to determine whether or not there is a difference between the current and final joint angle of the swing casting 106 (delta joint angle of swing casting). Upon initialization, the current joint angle of the swing casting would correspond to the joint angle of the swing casting at the initial dump location. If the delta joint angle of the swing casting is zero then control is passed along a path 708 to a finish block 710. If the delta joint angle of the boom is not zero then control is passed along a path 712 to a decisional block 714. As indicated by decisional block 714, the swing valve control module 218 is adapted to determine whether or not the bucket 130 is above or below the ground. If the bucket 130 is above the ground then control is passed along a path 716 to an execution block 718. As indicated by execution block 718 and as will be described more fully herein, a first fuzzy controller is enabled and control is passed along a path 720 is an execution block 722. As indicated by execution block 722, the swing valve control module 218 is adapted to do nothing. Returning to decisional block 714, if the bucket 130 is below the ground then control is passed along a path 724 to the execution block 722 where the swing valve control module 218 is adapted to do nothing. Control is then passed along a path 726 to an execution block 728. As indicated by execution block 728, the swing valve control module 218 is adapted to generate a fuzzified boom hydraulic valve control signal. Control is then returned along a path 730 to decisional block 706.

Figure 8:
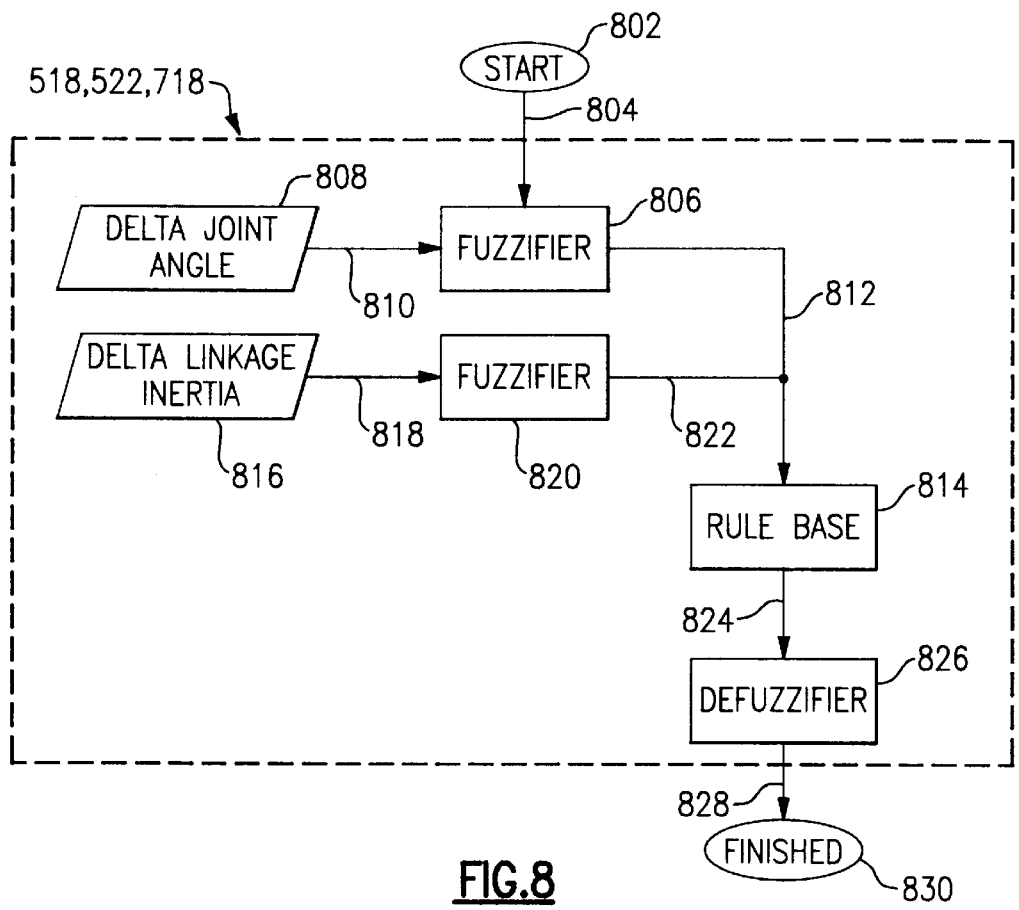
FIG. 8 is a high level flow chart showing the general operation of the first and second fuzzy controllers.

Referring to FIG. 8, wherein the operation of the first fuzzy controllers 518 and 718 and second fuzzy controller 522 is described. For purposes of illustration only the operation of first fuzzy controllers 518 with reference to control of the boom valve control module 220 is described. As indicated by a start block 802, the first fuzzy controller 518 is enabled. Control is then passed along a path 804 to execution blocks 806 and 820. As indicated by execution block 806, the first fuzzy controller 518 is adapted to enable a first fuzzifier which as shown by block 808 and path 810 is adapted to receive a boom delta joint angle value. The first fuzzifier is further adapted to generate a fuzzified boom delta joint angle value. Control is then passed along a path 812 to an execution block 814. As indicated by execution block 820, the first fuzzy controller 518 is adapted to enable a second fuzzifier which as shown by blocks 816 and path 818 is adapted to receive a delta inertia value for the work implement 102. The second fuzzifier is further adapted to generate a fuzzified delta inertia value. Control is then passed along a path 822 to execution block 814. As indicated by execution block 822, the first fuzzy controller 518 is adapted to enable a rule base which as will be described more fully herein is adapted to infer and generate a fuzzified boom hydraulic valve control signal. Control is then passed along a path 824 to an execution block 826. As indicated by execution block 826, the first fuzzy controller 518 is adapted to enable a de-fuzzifier which is adapted to convert the fuzzified boom hydraulic valve control signal into a de-fuzzified boom hydraulic valve control signal. Control is then passed along a path 828 to a finish block 830. The operation of the first fuzzy controller 518 and 718 and the second fuzzy controller 522 is substantially similar for the stick valve control module 222 and the e-stick valve control module 226. The rule base for the first fuzzy controller is different than the rule base for the second fuzzy controller insomuch as the first fuzzy controller is adapted for implementation when the bucket 130 is above ground whereas the second fuzzy controller is adapted for implementation when the bucket 130 is below ground.

Figure 9:
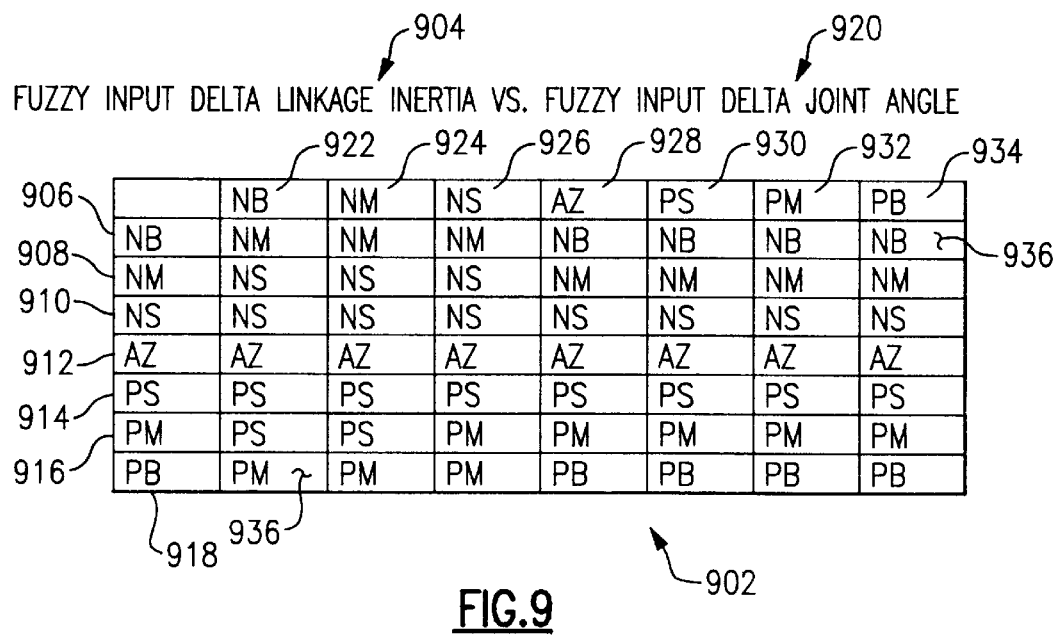
FIG. 9 is a high block diagram showing a rule matrix of a rule base of the present invention.

Referring to FIG. 9, a rule matrix 902 for the rule base 814 (FIG. 8) is described. As shown the rule matrix 902 plots the fuzzified delta linkage inertia value 904 versus the fuzzified delta joint angle 920. There are a total of five (5) rule matrix, one for each joint angle: the swing joint angle $\theta_{swing}$ 112, the boom joint angle $\theta_{boom}$ 120, the stick joint angle $\theta_{stick}$ 128, the bucket joint angle $\theta_{bucket}$ 136, and the e-stick displacement 142. In the example shown, the fuzzified delta linkage inertia value 904 and the fuzzified delta joint angle 920 comprise negative big(NB) 906 and 922, respectively, negative medium(NM) 908 and 924, respectively, negative small (NS) 910 and 926, respectively, positive small(PS) 914 and 930, respectively, positive medium(PM) 916 and 932, respectively, and positive big(PB) 918 and 934, respectively. With the use of the available information, each of such rules 936 in the rule matrix 902 involves the use of a fuzzy logic system designed to minimize inertia as each of the joint angles are moved to and from the dig and dump locations. For example, it takes a small amount of energy to move one of the joint angles if the work implement 102 has a small inertia versus a large inertia value and as such minimizes the energy.

A well-known principle in the use of fuzzy logic is its ability to solve problems of constructing a mathematical description or representation of an object or system using information that is available to accurately approximate such object or system. In "fuzzifying" various properties of relations of objects or systems, the standard procedure is to identify a relation with properties of the indicator function of that relation and translate those properties into properties of membership functions so as to approximate accurately such object or system. In other words, a known use of fuzzy logic is to use a known or determinable indicator to calculate another unknown characteristic that is directly related to the known or determinable indicator.

The present invention uses fuzzy logic to approximate the inertia using the measurement of the distance x (146). This measurement x (146) is the information that is readily available and as such the use of fuzzy logic permits the construction of a mathematical description of the inertia using the available information x (146) to represent the approximate inertia in the linkage.

INDUSTRIAL APPLICABILITY

The control system 100 can controllably move a work implement 102 (such as a backhoe) through a work cycle in a smooth manner and uses significantly less computing power than conventional control systems.

Other aspects and features of the present invention can be obtained from a study of the drawings, the disclosure, and the appended claims.

What is claimed is:

1. A control system for movement of a work implement from a dig location to a dump location, the work implement having a boom defined by a boom joint angle $\theta_{boom}$ and controllably moved by actuation of a boom hydraulic cylinder, a stick defined by a stick joint angle $\theta_{stick}$ and controllably moved by actuation of a stick hydraulic cylinder, a bucket defined by a bucket joint angle $\theta_{bucket}$ and controllably moved by a bucket hydraulic cylinder, and a swing casting defined by a swing joint angle $\theta_{swing}$, the control system comprises:

(a) a central processing unit and a memory device;
(b) an initialization module stored on said memory device and adapted to determine initial and final joint angles for an initial cycle of the work implement indicative of the dig and dump locations, respectively;
(c) a hydraulic valve connected to said central processing unit and to the work implement;
(d) a fuzzy control module stored on said memory device, said fuzzy control module comprising a first fuzzy controller adapted to instruct the central processing unit in a finite state manner to output a first de-fuzzified control signal to said hydraulic valve to cause the work implement to smoothly move from the dig location to the dump location while minimizing energy requirements; and
(e) wherein said first fuzzy controller comprises a second fuzzifier adapted to generate a first fuzzified delta linkage inertia value in response to a change between initial and final linkage inertia values.

2. The control system of claim 1, wherein said first fuzzy controller comprises a fuzzy-logic swing valve control module, a fuzzy-logic boom control module, and a fuzzy-logic stick valve control module each adapted to generate said first de-fuzzified control signal for output to said hydraulic valve for each initial and final joint angles value corresponding to the swing joint angle $\theta_{swing}$, the boom joint angle $\theta_{boom}$, and the stick joint angle $\theta_{stick}$.

3. The control system of claim 1, wherein said first fuzzy controller comprises a first fuzzifier adapted to generate a first fuzzified delta joint angle value in response to a change between the said initial and final joint angles.

4. The control system of claim 3, wherein said first fuzzy controller further comprises a first rule base adapted to infer a first fuzzified control signal in response to said first fuzzified delta joint angle value and said first fuzzified delta linkage inertia value.

5. The control system of claim 4, wherein said first fuzzy controller further comprises a defuzzifier adapted to output said first de-fuzzified control signal to said hydraulic valve in response to said first fuzzified control signal.

6. The control system of claim 5, wherein said first and second fuzzifiers each comprise fuzzy logic to infer said first fuzzified delta joint angle value based upon the difference between said initial and final joint angles.

7. The control system of claim 6, wherein said rule base comprises a plurality of rules adapted to output said first fuzzified control signal to said defuzzifier in response to said first fuzzified delta joint angle value and said first fuzzified delta linkage inertia value, said plurality of rules being adapted to conserve energy necessary to move the work element from the dig location to the dump location.

8. The control system of claim 7, wherein said fuzzy-logic boom valve control module and said fuzzy-logic stick valve control module each comprise a second fuzzy controller.

9. The control system of claim 8, wherein said plurality of rules are configured in a rule matrix bounded by a plurality of fuzzified delta linkage inertia values stored in said rule matrix and a plurality of fuzzified delta joint angle values stored in said rule matrix.

10. The control system of claim 9, wherein said first fuzzified delta linkage inertia value and said first fuzzified delta joint angle value correspond to one of said plurality of fuzzified delta linkage inertia values stored in said rule matrix and one of said plurality of fuzzified delta joint angle values stored in said rule matrix, respectively, to thereby infer one of said plurality of rules.

11. The control system of claim 10, wherein each of said fuzzy-logic swing valve control module, said fuzzy-logic boom control module, and said fuzzy-logic stick valve control module comprise a plurality of computer instructions.

12. The control system of claim 11, wherein said plurality of computer instructions has a source code written in C natural computer language.

13. The control system of claim 12, wherein said memory device is a programmable memory.

14. A method for controlling movement of a work implement having at least one hydraulic valve from a specified dig location to a specified dump location, the method comprising the steps of:
- (a) determining specified initial and final joint angles for an initial cycle of the work implement indicative of the specified dig and dump locations, respectively;
- (b) entering a delta joint angle value into a first fuzzifier;
- (c) entering a delta linkage inertia value into a second fuzzifier;
- (d) generating a fuzzified delta joint angle value;
- (e) generating a fuzzified delta linkage inertia value;
- (f) inferring from a rule base a first fuzzified hydraulic valve control signal based upon said fuzzified delta joint angle value and said fuzzified delta linkage inertia value;
- (g) generating a de-fuzzified hydraulic valve control signal; and
- (h) outputting said de-fuzzified hydraulic valve control signal to the hydraulic valve to control movement of the work implement.

* * * * *

UNITED STATES PATENT AND TRADEMARK OFFICE
CERTIFICATE OF CORRECTION

PATENT NO. : 6,691,010 B1
DATED : February 10, 2004
INVENTOR(S) : John R. Gay

It is certified that error appears in the above-identified patent and that said Letters Patent is hereby corrected as shown below:

Column 8,
Lines 17 and 64, insert -- valve -- before "control"

Signed and Sealed this

Fifteenth Day of March, 2005

JON W. DUDAS
*Director of the United States Patent and Trademark Office*